US009268090B2

(12) United States Patent
Yokota et al.

(10) Patent No.: US 9,268,090 B2
(45) Date of Patent: Feb. 23, 2016

(54) FUSION SPLICING APPARATUS AND METHOD THEREOF

(71) Applicant: FUJIKURA LTD., Koto-ku, Tokyo (JP)

(72) Inventors: Kouichi Yokota, Sakura (JP); Katsumi Sasaki, Sakura (JP); Noriyuki Kawanishi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 13/948,809

(22) Filed: Jul. 23, 2013

(65) Prior Publication Data

US 2013/0306223 A1    Nov. 21, 2013

Related U.S. Application Data

(63) Continuation of application No. PCT/JP2011/051249, filed on Jan. 24, 2011.

(51) Int. Cl.
*G02B 6/255* (2006.01)
*G02B 6/36* (2006.01)

(52) U.S. Cl.
CPC ............ *G02B 6/2551* (2013.01); *G02B 6/2555* (2013.01); *G02B 6/2553* (2013.01); *G02B 6/3616* (2013.01); *G02B 6/3636* (2013.01)

(58) Field of Classification Search
CPC ...................................................... G02B 6/255
USPC .............................................. 156/158, 379.8
See application file for complete search history.

(56) References Cited

U.S. PATENT DOCUMENTS

| | | | | |
|---|---|---|---|---|
| 4,749,252 A * | 6/1988 | Yanagi et al. | | 385/96 |
| 6,294,760 B1 * | 9/2001 | Inoue et al. | | 219/383 |
| 6,430,351 B1 * | 8/2002 | Takahashi et al. | | 385/137 |
| 6,467,973 B2 * | 10/2002 | Takahashi et al. | | 385/96 |
| 2001/0053268 A1 * | 12/2001 | Takahashi et al. | | 385/96 |
| 2009/0214166 A1 * | 8/2009 | Huang et al. | | 385/96 |

FOREIGN PATENT DOCUMENTS

| | | |
|---|---|---|
| EP | 0319041 A2 | 6/1989 |
| JP | 63-184712 A | 7/1988 |
| JP | 4-172406 A | 6/1992 |
| JP | 2860831 B2 | 2/1999 |
| JP | 2002-6167 A | 1/2002 |

OTHER PUBLICATIONS

International Search Report for PCT/JP2011/051249 dated Feb. 15, 2011.
European Search Report in European Application No. 11856867.4 mailed Jul. 23, 2014.
Communication dated Apr. 3, 2015 from the State Intellectual Property Office of the People's Republic of China in counterpart application No. 201180065790.6.
Communication dated Dec. 15, 2015 from the State Intellectual Property Office of the P.R.C. in counterpart application No. 201180065790.6.

* cited by examiner

*Primary Examiner* — Michael N Orlando
*Assistant Examiner* — Margaret Squalls
(74) *Attorney, Agent, or Firm* — Sughrue Mion, PLLC

(57) ABSTRACT

A fusion splicing apparatus includes discharge electrodes 13 and 15 to discharge-heat and fusion-splice end faces 5a and 7a of optical fibers 1 and 3, fiber holders 17 and 19 to hold the optical fibers 1 and 3, V-groove blocks 21 and 23 to receive, position, and fix parts of the optical fibers 1 and 3 on the end face sides of the fiber holders 17 and 19, V-groove-block moving mechanisms 33 and 35 to move the V-groove blocks 21 and 23 so as to shift an axial center of the optical fibers 1 and 3 from a straight line between the discharge electrodes 13 and 15, and holder moving mechanisms 37 and 39 to move the fiber holders 17 and 19 so as to shift the axial center of the optical fibers 1 and 3 from the straight line between the discharge electrodes 13 and 15.

4 Claims, 7 Drawing Sheets

FIG.6
(a)
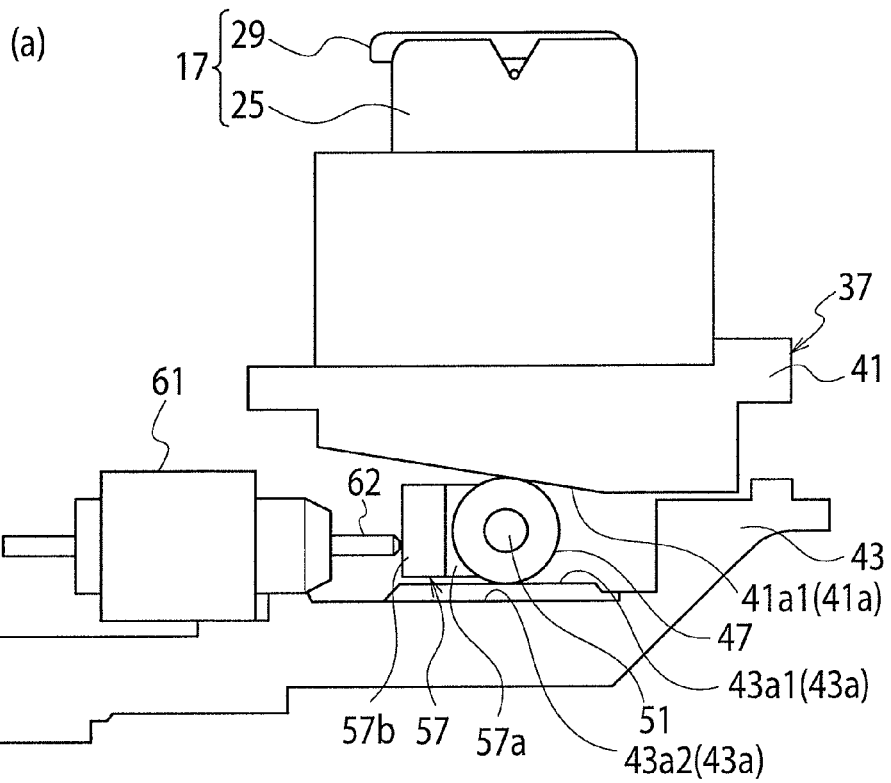
(b)
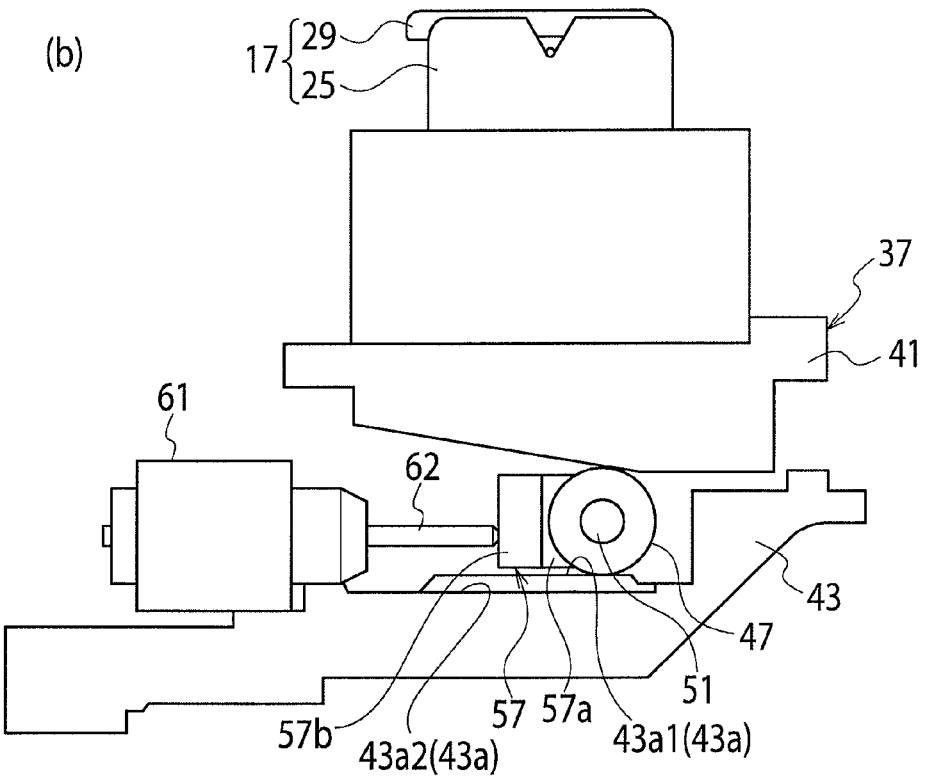

FUSION SPLICING APPARATUS AND METHOD THEREOF

CROSS REFERENCE TO RELATED APPLICATION

This application is a Continuation of PCT Application No. PCT/JP2011/051249, filed on Jan. 24, 2011.

TECHNICAL FIELD

The present invention relates to a fusion splicing apparatus for and a fusion splicing method of fusion-splicing end faces of a pair of optical fibers to each other by discharge heating with the use of a pair of discharge electrodes.

BACKGROUND ART

Generally, fusion-splicing end faces of a pair of optical fibers to each other by discharge heating is carried out by holding the pair of optical fibers with holding units and by placing, positioning, and fixing parts of the optical fibers on the end-face sides of the holding units into V-grooves formed in V-groove blocks.

At this time, a virtual straight line joining a pair of discharge electrodes to each other and an axial center of the optical fibers are usually set to agree with each other. In this case, the holding units and V-groove blocks hold and fix the pair of optical fibers so that the axial center of the optical fibers agrees with the straight line that joins the pair of discharge electrodes to each other.

If the optical fibers have a low melting point, the fusion splicing thereof must avoid excessive fusion. This raises a necessity of slightly shifting the axial center of the pair of optical fibers from the virtual straight line that joins the pair of discharge electrodes to each other. To fulfill the necessity, only the V-groove blocks that are located in the vicinities of the splicing end faces of the optical fibers may be moved.

A known technique of shifting an axial center of optical fibers from a virtual straight line joining a pair of discharge electrodes and fusion-splicing the optical fibers is described in Japanese Patent Publication No. 2860831 (Patent Literature 1). A known technique of moving a V-groove block is described in Japanese Unexamined Patent Application Publication No. 2002-6167 (Patent Literature 2).

CITATION LIST

Patent Literature

Patent Literature 1: Japanese Patent Publication No. 2860831
Patent Literature 2: Japanese Unexamined Patent Application Publication No. 2002-6167

SUMMARY OF INVENTION

Problem to be Solved by Invention

The technique described in Patent Literature 1, however, shifts the axial center of the optical fibers so that a discharge temperature distribution between the electrodes is nearly equalized to efficiently apply discharge heat to the optical fibers and does not mention about a mechanism to move the optical fibers and shift the axial center thereof.

On the other hand, the technique described in Patent Literature 2 vertically moves the V-groove blocks to deal with optical fibers having different diameters. This related art only moves the V-groove blocks vertically and mentions nothing about the holding units. Accordingly, each optical fiber between the V-groove block and the holding unit is vertically biased and bent, and therefore, the V-groove block is unable to surely fix the optical fiber. This may deteriorate a spliced state of the optical fibers.

Accordingly, an object of the present invention is to stabilize a spliced state when fusion-splicing a pair of optical fibers with an axial center of the optical fibers shifted from a virtual straight line that joins a pair of discharge electrodes to each other.

Means to Solve Problem

An aspect of the present invention provides a fusion splicing apparatus including a pair of discharge electrodes that discharge-heat end faces of a pair of optical fibers and fusion-splice the end faces to each other, holding units that hold the pair of optical fibers, V-groove blocks each having a V-groove that receives, positions, and fixes a part of the optical fiber on an end-face side of the holding unit, V-groove-block moving mechanisms that move the V-groove blocks to shift an axial center of the pair of optical fibers from a straight line joining the pair of discharge electrodes to each other, and holding-unit moving mechanisms that move the holding units according to the movements of the V-groove-block moving mechanisms, to shift the axial center of the pair of optical fibers from the straight line joining the pair of discharge electrodes to each other.

The holding-unit moving mechanism may have a pair of first and second guide faces that cross the moving direction of the holding unit, the first guide face being a tilt face tilted with respect to a plane that is orthogonal to the moving direction, a first guide member that is positioned between the pair of guide faces, is in contact with the tilt face, and is moved along the plane that is orthogonal to the moving direction, a second guide member that is in contact with the second guide face opposing the tilt face and is moved along the plane that is orthogonal to the moving direction, and a drive unit that moves the guide members along the plane that is orthogonal to the moving direction.

The first and second guide members may be rotary bodies that are rotatably supported with one rotary support shaft.

Another aspect of the present invention provides a fusion splicing method of holding a pair of optical fibers with holding units, receiving, positioning, and fixing parts of the optical fibers on splicing end face sides of the holding units in V-grooves of V-groove blocks, and fusion-splicing end faces of the pair of optical fibers by discharge heating with the use of a pair of discharge electrodes. The method includes moving the V-groove blocks to shift an axial center of the pair of optical fibers from a straight line that joins the pair of discharge electrodes to each other, moving the holding units according to the movements of the V-groove blocks, to shift the axial center of the pair of optical fibers from the straight line that joins the pair of discharge electrodes to each other, and fusion-splicing the end faces of the pair of optical fibers by discharge heating.

BRIEF DESCRIPTION OF DRAWINGS

FIG. 1 is a front view of a fusion splicing apparatus according to an embodiment of the present invention, in which FIG. 1(a) illustrates a state that an axial center of a pair of optical fibers agrees with a virtual straight line that joins a pair of discharge electrodes to each other and FIG. 1(b) illustrates a state that the axial line of the pair of optical fibers is shifted from the virtual straight line that joins the pair of discharge electrodes to each other.

FIG. 5 is a perspective view of a drive unit of the holder moving mechanism including a linear actuator, rollers, and the like.

FIG. 6 is an operation explaining view of the holder moving mechanism, in which FIG. 6(a) illustrates a state that the rollers are moved backward to lower the fiber holder and FIG. 6(b) illustrates a state that the rollers are moved forward to raise the fiber holder.

MODE OF IMPLEMENTING INVENTION

An embodiment of the present invention will be explained in detail with reference to the drawings.

Figure 1:
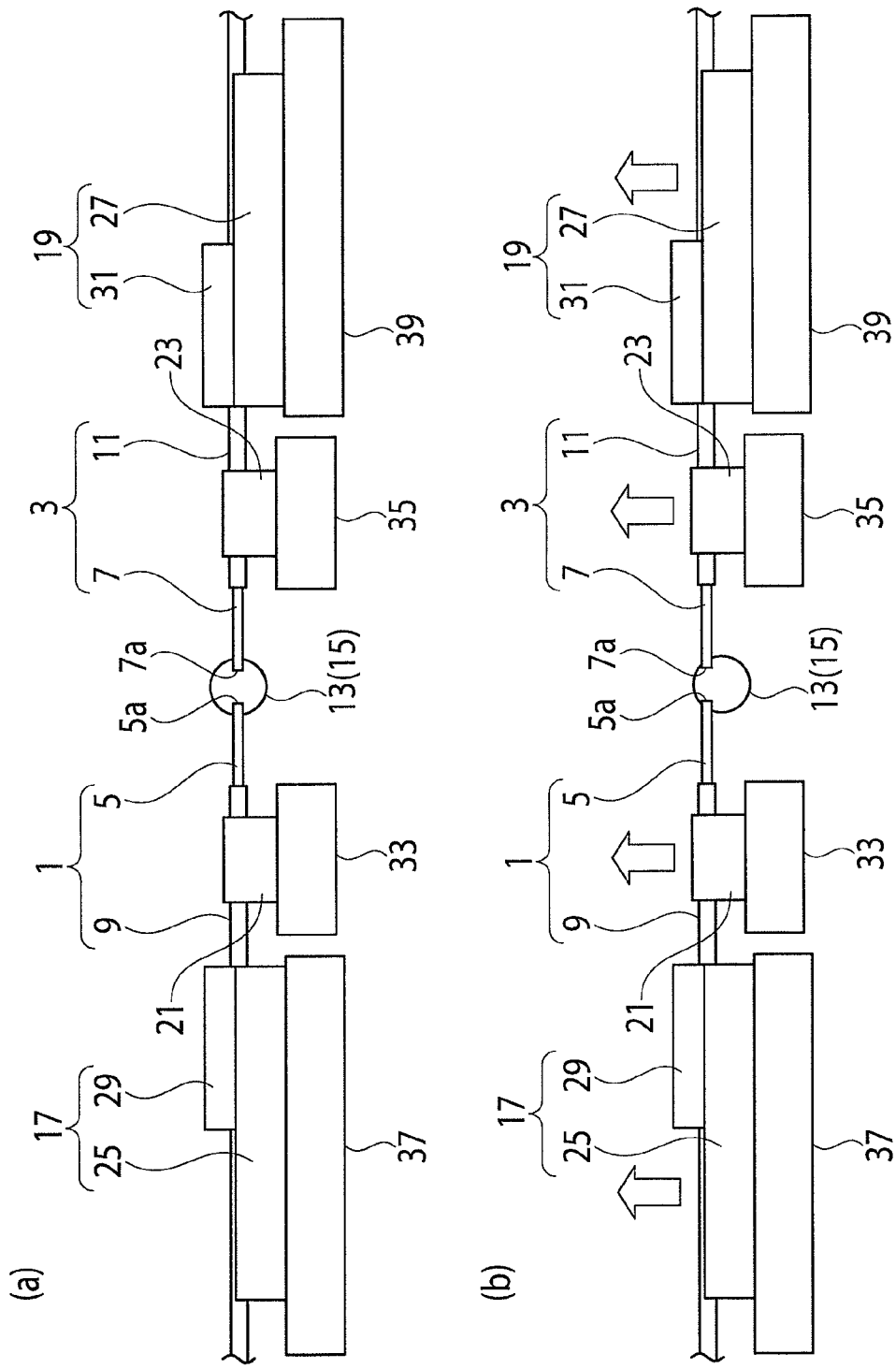

As illustrated in FIG. 1, a pair of left and right optical fibers 1 and 3 have glass fibers 5 and 7 (e.g., silica based) and resin coats 9 and 11 covering the glass fibers 5 and 7. The glass fibers 5 and 7 exposed from the resin coats 9 and 11 have end faces 5a and 7a that are fusion-spliced to each other. Used for the fusion splicing are a pair of discharge electrodes 13 and 15 that have a main axis orthogonal to an axial line of the optical fibers 1 and 3 and are arranged in a direction orthogonal to a plane of FIG. 1.

The resin coats 9 and 11 of the pair of optical fibers 1 and 3 are held with fiber holders 17 and 19 serving as the holding units. Parts of the resin coats 9 and 11 that are on the end faces 5a and 7a sides of the fiber holders 17 and 19 are positioned and fixed with V-groove blocks 21 and 23. The V-groove blocks 21 and 23 may position and fix parts of the glass fibers 5 and 7.

The fiber holders 17 and 19 have holder bodies 25 and 27 having recesses to receive the optical fibers 1 and 3. The recesses are pressed from above with open/close presser plates 29 and 31 to hold and fix the optical fibers 1 and 3.

On the other hand, the V-groove blocks 21 and 23 have V-grooves that are formed in the top faces of the blocks, to receive the optical fibers 1 and 3. Clamps (not illustrated) are provided to partly enter the V-grooves to press, position, and fix the optical fibers 1 and 3 with respect to the V-groove blocks 21 and 23.

According to the embodiment, there are arranged V-groove-block moving mechanisms 33 and 35 that move the V-groove blocks 21 and 23 in a vertical direction in FIG. 1 and holder moving mechanisms 37 and 39 that serve as the holding-unit moving mechanisms to move the fiber holders 17 and 19 in the vertical direction in FIG. 1.

The fusion splicing apparatus of the above-mentioned configuration will be explained when fusion-splicing the glass fibers 5 and 7 that have a low melting point to be easily affected by heat. In this case, the axial line of the pair of optical fibers 1 and 3 is shifted from a virtual straight line (a straight line extending in a direction orthogonal to the plane of FIG. 1) that joins the pair of discharge electrodes 13 and 15 to each other as illustrated in FIG. 1(b) from the state of FIG. 1(a) in which the axial line and virtual straight line vertically agree with each other.

Namely, from the state of FIG. 1(a), the V-groove-block moving mechanisms 33 and 35 are driven to raise the V-groove blocks 21 and 23 and the holder moving mechanisms 37 and 39 are driven to raise the fiber holders 17 and 19. As a result, the axial line of the pair of optical fibers 1 and 3 does not cross the virtual straight line that joins the pair of discharge electrodes 13 and 15 to each other and comes above the virtual straight line.

In this state, the discharge electrodes 13 and 15 are discharged to generate heat that fuses and splices the vicinities of the end faces 5a and 7a of the optical fibers 1 and 3. At this time, the center of the discharge electrodes 13 and 15 is shifted from the axial line of the optical fibers 1 and 3, to weaken discharge power acting on the optical fibers 1 and 3, so that the low-melting-point optical fibers are not excessively fused and are properly fusion-spliced.

At the time of fusion splicing, the end faces 5a and 7a are substantially brought into contact with each other.

According to the embodiment, the pair of optical fibers 1 and 3 are lifted to position the axial center thereof above the virtual straight line that joins the discharge electrodes 13 and 15 to each other. At this time, the embodiment lifts not only the V-groove blocks 21 and 23 but also the fiber holders 17 and 19. As a result, the optical fibers 1 and 3 are arranged in a linear fashion between the V-groove blocks 21 and 23 and the fiber holders 17 and 19, so that the V-groove blocks 21 and 23 that are close to the splicing end faces 5a and 7a surely fix the optical fibers 1 and 3 to provide a stable spliced state.

Figure 2:
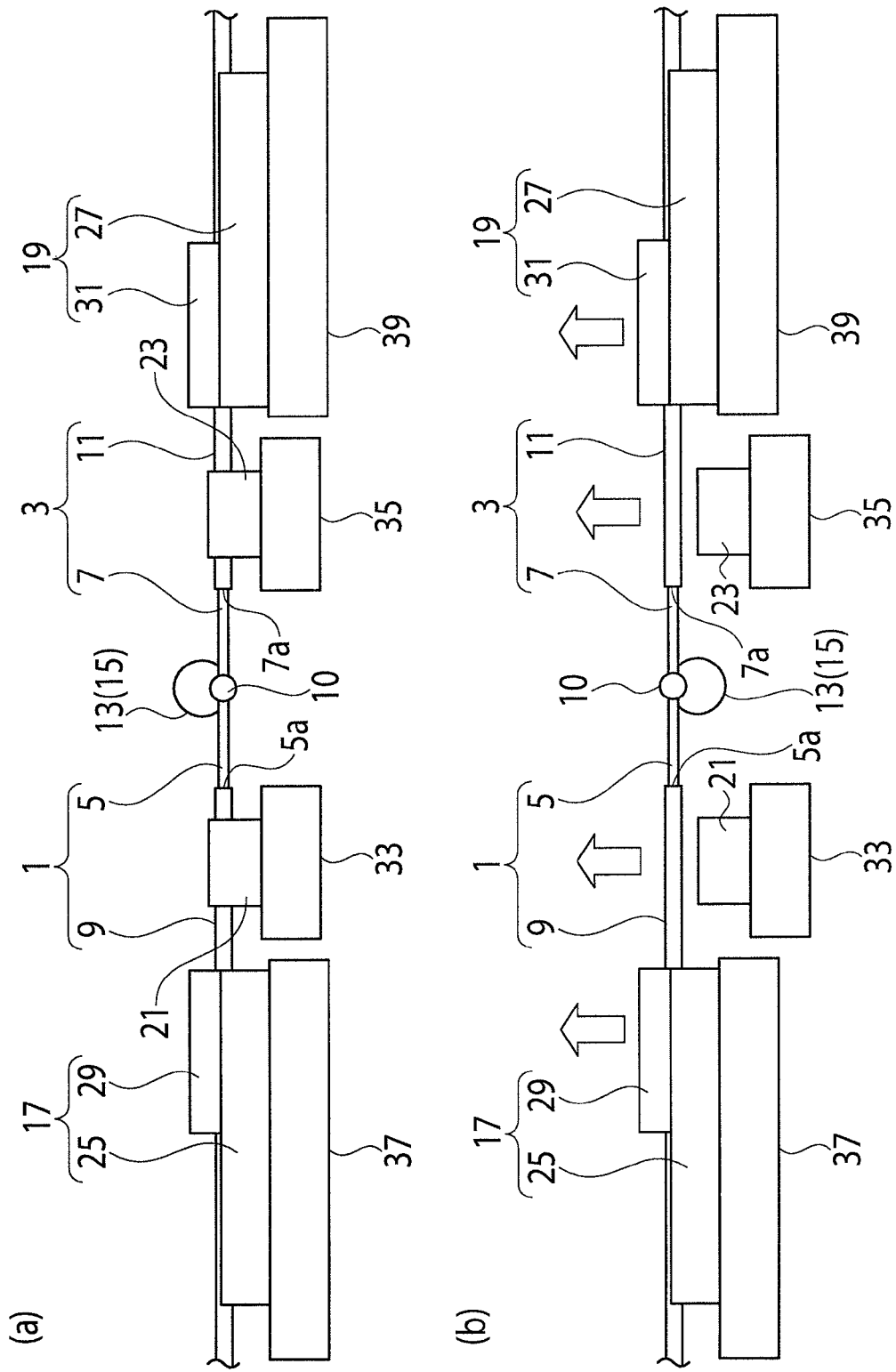
FIG. 2(a) is a front view corresponding to FIG. 1(b) and illustrating a state that the axial line of the pair of optical fibers is downwardly shifted from the virtual straight line that joins the pair of discharge electrodes to each other and FIG. 2(b) is a front view illustrating the fusion-spliced optical fibers being removed from the state of FIG. 2(a).

As illustrated in FIG. 2(a), the fusion splicing may be carried out after downwardly moving the pair of optical fibers 1 and 3 from the state of FIG. 1(a) by driving the V-groove-block moving mechanisms 33 and 35 and holder moving mechanisms 37 and 39. Then, the center position of the discharge electrodes 13 and 15 is shifted from the axial line of the optical fibers 1 and 3, to weaken discharge power applied to the optical fibers 1 and 3 so that even the optical fibers having a low melting point are prevented from being excessively fused and are properly fusion-spliced. A reference numeral 10 in FIG. 2 indicates a spliced part formed by fusing the end faces 5a and 7a of the optical fibers 1 and 3.

In the example of FIG. 2, the axial line of the optical fibers 1 and 3 is positioned below the virtual straight line that joins the pair of discharge electrodes 13 and 15 to each other, and therefore, there is a risk that the optical fibers 1 and 3, when taken out after the fusion splicing, interfere with the discharge electrodes 13 and 15. To avoid this, the fiber holders 17 and 19 are moved as illustrated in FIG. 2(b) to a position of FIG. 1(b) or above. With this, the optical fibers 1 and 3 taken out after the fusion splicing will not interfere with the discharge electrodes 13 and 15.

The V-groove-block moving mechanisms 33 and 35 each may employ a small linear actuator such as a stepping motor, similar to the holder moving mechanisms 37 and 39 to be explained later.

Figure 3:
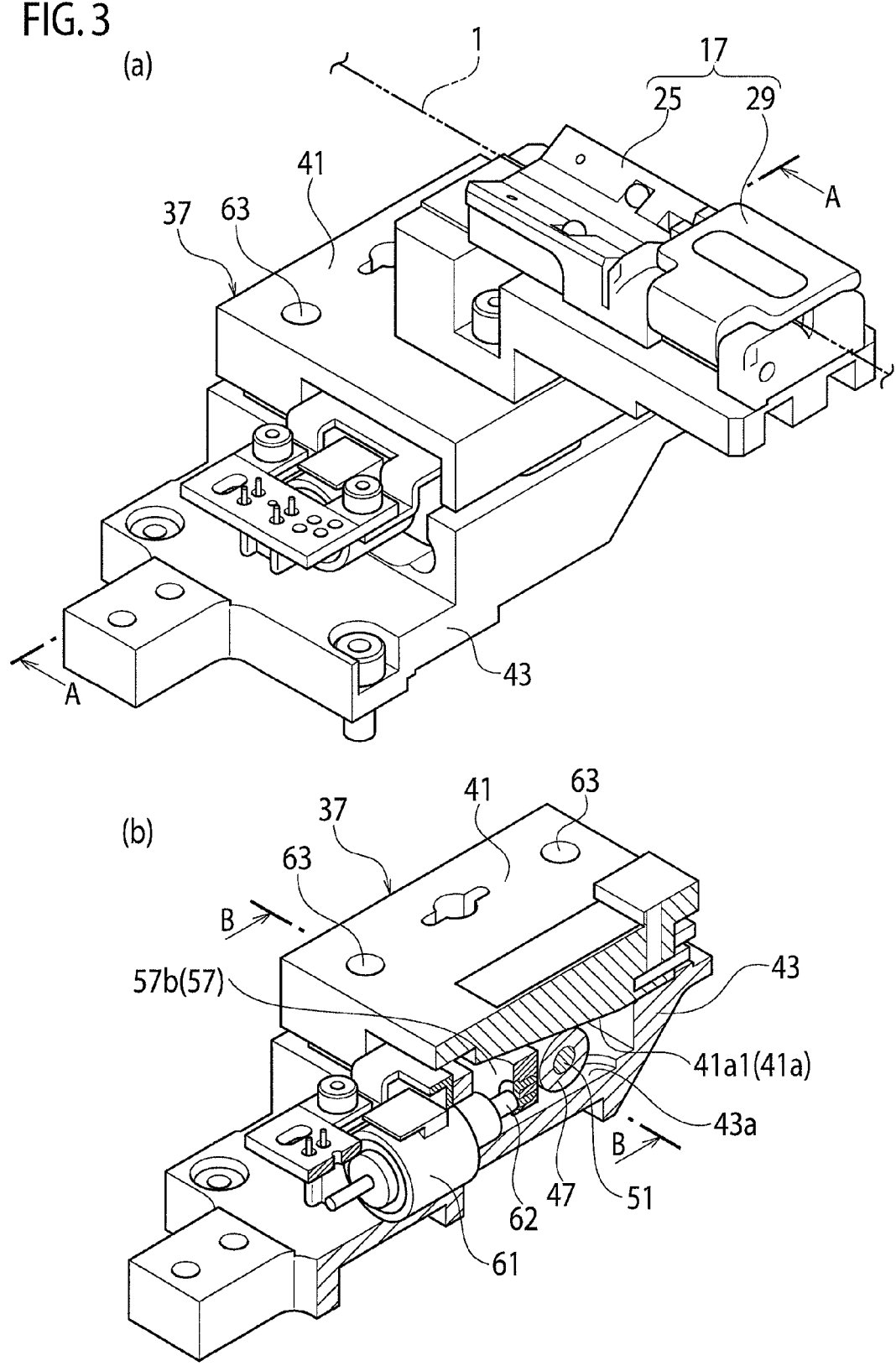
FIG. 3(a) is a perspective view of a fiber holder and a holder moving mechanism that vertically moves the fiber holder and FIG. 3(b) is a sectional view taken along A-A of FIG. 3(a) with the fiber holder omitted.

The holder moving mechanisms 37 and 39 will be explained. FIG. 3 illustrates the holder moving mechanism 37 for the fiber holder 17 that holds the optical fiber 1. The holder moving mechanism 39 for the fiber holder 19 that holds the other optical fiber 3 has a left-right symmetrical shape with respect to the holder moving mechanism 37 and is similarly configured. Accordingly, the holder moving mechanism 37 will be explained as a representative.

The holder moving mechanism 37 has, as illustrated in FIG. 3(a), a movable body 41 that is provided with the fiber holder 17 on a top face thereof and is vertically movable and a stationary body 43 that serves as a base unit to support the movable body 41 so that the movable body 41 may vertically move.

The movable body 41 has, as illustrated in FIG. 3(b), a bottom face that is a tilt face 41a opposing the stationary body 43 and inclined with respect to a plane (horizontal plane) that is orthogonal to a moving direction of the movable body 41. Namely, the tilt face 41a is tilted with respect to the horizontal plane in a direction orthogonal to the axial line of the optical fiber 1. On the other hand, a top face 43a of the stationary body 43 opposing the tilt face 41a is parallel to the horizontal plane that is orthogonal to the moving direction of the movable body 41. The tilt face 41a of the movable body 41 and the top face 43a of the stationary body 43 serve as the pair of guide faces that cross the moving direction of the fiber holder 17 and face each other.

Figure 4:
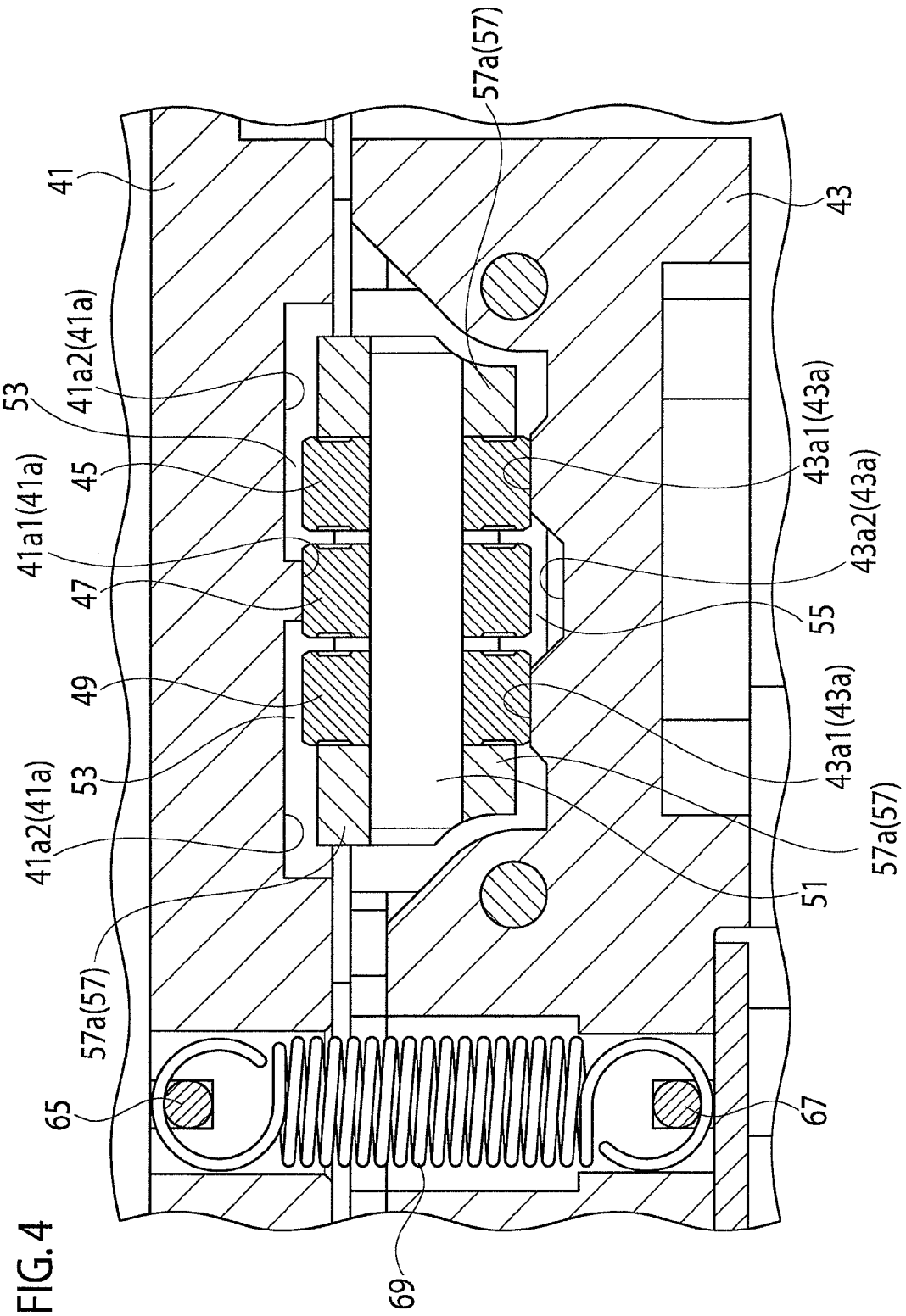
FIG. 4 is a sectional general view of the holder moving mechanism taken along B-B of FIG. 3(b).

Between the tilt face 41a of the movable body 41 and the top face 43a of the stationary body 43 serving as the pair of guide faces, there are arranged, as illustrated in FIG. 4, three rotary bodies, i.e., rollers 45, 47, and 49 that are rotatably supported with one rotary support shaft 51. The rotary support shaft 51 is parallel to the axial line of the optical fiber 1, and therefore, the three rollers 45, 47, and 49 rotate and move in the tilt direction of the tilt face 41a.

The tilt face 41a of the movable body 41 has, as illustrated in FIG. 4, a center tilt part 41a1 that is in contact with the center roller 47 serving as the first guide member and a side tilt part 41a2 that corresponds to the two side rollers 45 and 49 serving as the second guide member, the center tilt part 41a1 downwardly protruding from the side tilt part 41a2 toward the stationary body 43. At this time, the two side rollers 45 and 49 are spaced from the side tilt part 41a2, to form a gap 53 between them.

On the other hand, the top face 43a of the stationary body 43 has a side top face part 43a1 that is in contact with the two side rollers 45 and 49 and a center top face part 43a2 that corresponds to the center roller 47, the side top face part 43a1 upwardly protruding from the center top face part 43a2 toward the movable body 41. At this time, the center roller 47 is spaced from the center top face part 43a2, to form a gap 55 between them.

Namely, the center roller 47 among the above-mentioned three rollers 45, 47, and 49 is always in contact with the center tilt part 41a1 (tilt face 41a) of the movable body 41 and the two side rollers 45 and 49 are always in contact with the side top face part 43a1 (top face 43a) of the stationary body 43.

Figure 5:
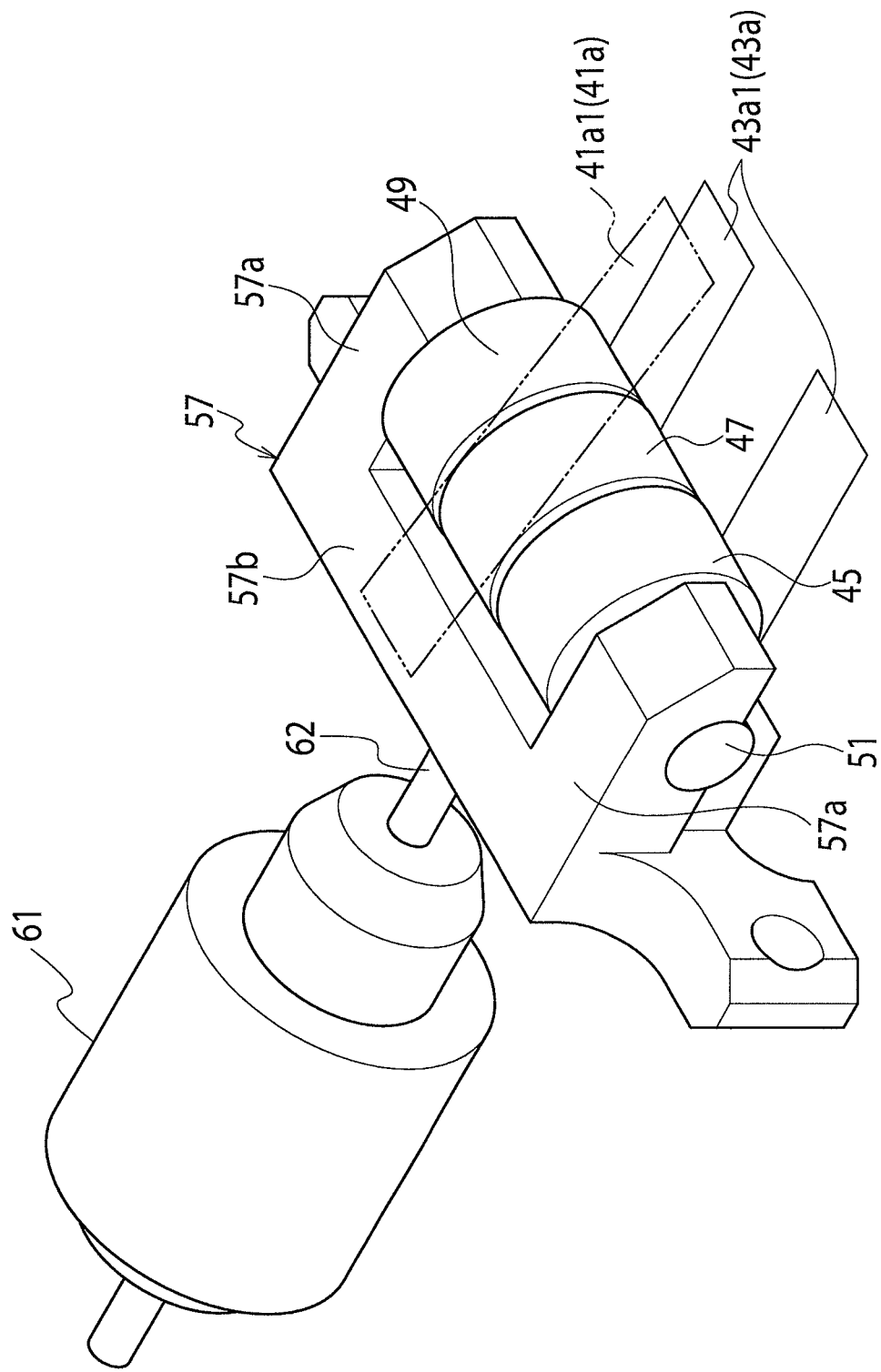

The rotary support shaft 51 rotatably supporting these three rollers 45, 47, and 49 is rotatably supported, as illustrated in FIG. 5, between front ends of a pair of arms 57a that forwardly protrude from left and right sides of a support bracket 57.

A linear actuator 61 serving as the drive unit to forwardly and backwardly move the above-mentioned three rollers 45, 47, and 49 together with the support bracket 57 is, for example, a rotary solenoid or a stepping motor with a drive shaft 62 turning and advancing. A front end of the drive shaft 62 is in contact with a connecting part 57b of the support bracket 57. By forwardly driving the linear actuator 61, the drive shaft 62 pushes the connecting part 57b of the support bracket 57, to advance the three rollers 45, 47, and 49.

At this time, as illustrated in FIG. 4, the center roller 47 moves in contact with the center tilt part 41a1 of the movable body 41 and the left and right rollers 45 and 49 move in contact with the side top face part 43a1 of the stationary body 43. As the rollers 45, 47, and 49 advance, the center roller 47 pushes the center tilt part 41a1 upward because the tilt face 41a (center tilt part 41a1) comes closer to the top face 43a in the forward direction. As a result, the movable body 41 is lifted up relative to the stationary body 43.

As illustrated in FIG. 3(b), the movable body 41 is provided with two guide shafts 63 that protrude toward the stationary body 43. The protruding lower sides of the guide shafts 63 are movably inserted into guide holes (not illustrated) of the stationary body 43. In addition, as illustrated in FIG. 4, the movable body 41 is provided with a spring support pin 65 and the stationary body 43 is provided with a spring support pin 67. Between the pins 65 and 67, there is arranged a coil spring 69 to push the movable body 41 and stationary body 43 toward each other.

Accordingly, when the rollers 45, 47, and 49 advance from the state of FIG. 6(a), the movable body 41 raises away from the stationary body 43 as illustrated in FIG. 6(b) with the guide shafts 63 being guided in the guide holes. This is carried out against the spring force of the coil spring 69. On the contrary, when the rollers 45, 47, and 49 retract from the state of FIG. 6(b), the movable body 41 lowers to approach the stationary body 43 as illustrated in FIG. 6(a) with the guide shafts 63 being guided in the guide holes. This is carried out under the spring force of the coil spring 69.

In this way, the holder moving mechanism 37 illustrated in FIGS. 3 to 6 drives the linear actuator 61 in a normal rotation fashion to advance the three rollers 45, 47, and 49, so that the two side rollers 45 and 49 turn and move along the side top face part 43a1 of the stationary body 43, and at the same time, the center roller 47 pushes the center tilt part 41a1 of the movable body 41 upward to raise the movable body 41. As the movable body 41 ascends, the fiber holder 17 ascends according to an upward movement of the V-groove block 21.

If the linear actuator 61 is reversely driven, the drive shaft 62 retracts so that the spring force of the coil spring lowers the movable body 41, thereby lowering the fiber holder 17.

These movements are similarly carried out by the holder moving mechanism 39, so that the corresponding fiber holder 19 ascends according to an upward movement of the V-groove block 23.

According to the embodiment, the holder moving mechanisms 37 and 39 each have the pair of guide faces that are orthogonal to the moving direction of the fiber holders 17 and 19 and face each other. One of the guide faces is the tilt face 41a that is tilted with respect to a plane that is orthogonal to the moving direction. In addition, each of the holder moving mechanisms has the roller 47 that is positioned between the pair of guide faces, is in contact with the tilt face 41a, and moves along the plane that is orthogonal to the moving direction, the rollers 45 and 49 that are in contact with the other guide face and move along the plane that is orthogonal to the moving direction, and the linear actuator 61 that drives the rollers 45, 47, and 49 along the plane that is orthogonal to the moving direction.

By driving the linear actuator 61, the embodiment advances the rollers 45, 47, and 49. With this simple configuration, the embodiment precisely and easily lifts up the fiber holders 17 and 19 according to an upward movement of the V-groove blocks 21 and 23.

According to the embodiment, the rollers 45, 47, and 49 are rotary bodies rotatably supported with the single rotary support shaft 51. Accordingly, the rollers 45, 47, and 49 rotate and move along the tilt face 41a of the movable body 41 and the top face 43a of the stationary body 43. At this time, the tilt face 41a has a small tilt angle and is smooth with respect to the top face 43a, and therefore, the movable body 41 is able to be lifted up even with the linear actuator 61 that is compact to provide small torque.

Among the three rollers 45, 47, and 49, one is in contact with the upper tilt face 41a (center tilt part 41a1) and two side ones are in contact with the lower top face 43a (side top face part 43a1). This prevents the three rollers 45, 47, and 49 from being stalled between the upper tilt face 41a and the lower top face 43a.

Figure 7:
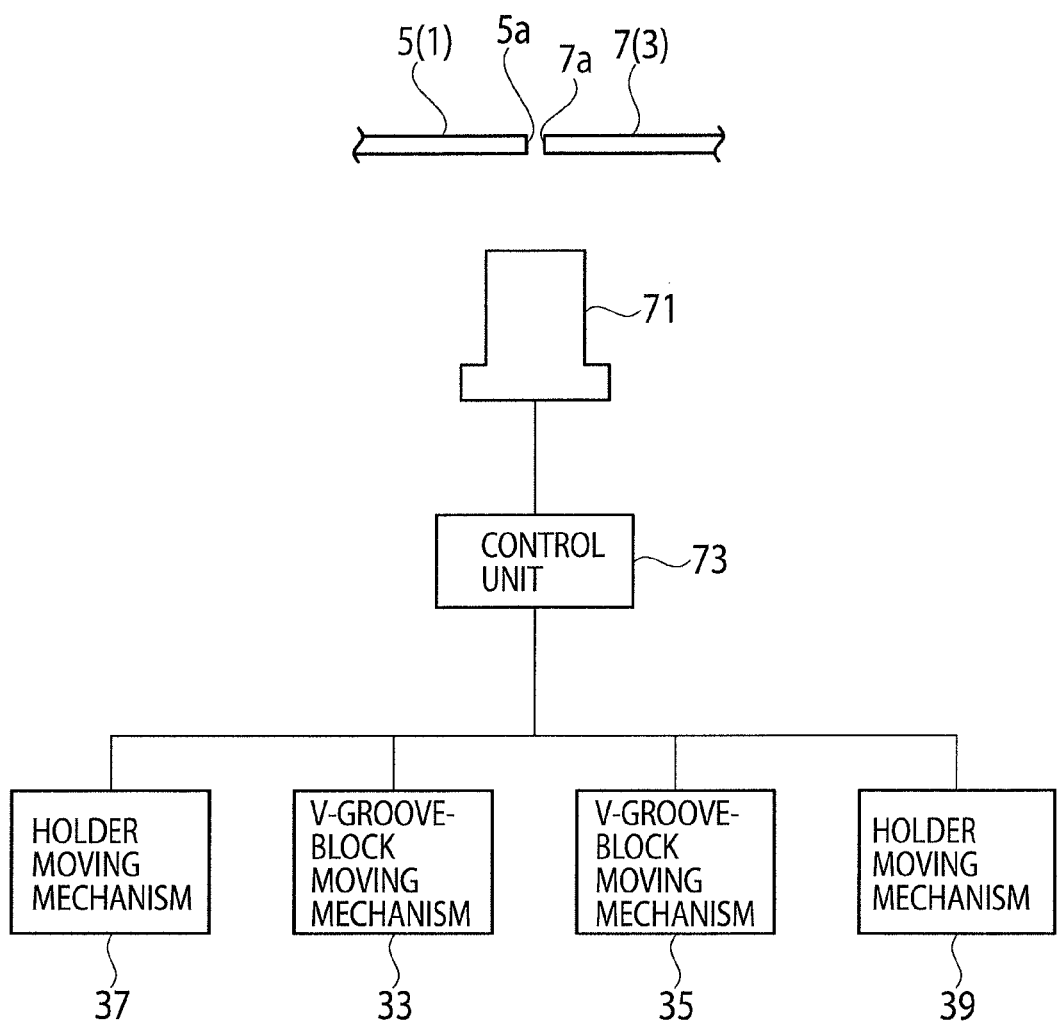
FIG. 7 is a control block diagram of the fusion splicing apparatus.

As illustrated in FIG. 7, the end faces 5a and 7a of the pair of optical fibers 1 and 3 and the vicinities thereof are photographed from the side thereof with one or a plurality of cameras 71. According to the photographed image data, a control unit 73 may drive the V-groove-block moving mechanisms 33 and 35 and holder moving mechanisms 37 and 39. For example, inclination angles of the optical fibers 1 and 3 with respect to a horizontal plane, a parallelism between the optical fibers 1 and 3, and the like are used to individually control and drive the V-groove-block moving mechanisms 33 and 35 and holder moving mechanisms 37 and 39.

With this, the axial centers of the pair of optical fibers 1 and 3 are surely and accurately agreed with each other, to form a high-quality fusion-spliced part.

INDUSTRIAL APPLICABILITY

The present invention is applicable to fusion splicing apparatuses and fusion splicing methods that employ a pair of discharge electrodes to discharge-heat end faces of a pair of optical fibers and fusion-splice the end faces to each other.

EFFECT OF INVENTION

According to the present invention, an axial center of a pair of optical fibers is shifted from a virtual straight line that joins a pair of discharge electrodes to each other and end faces of the optical fibers are fusion-spliced. At this time, the V-groove blocks to position and fix the optical fibers as well as the holding units to hold the optical fibers are moved, to make each optical fiber substantially straight between the V-groove block and the holding unit. As a result, the V-groove blocks that are close to the splicing end faces of the optical fibers are able to surely fix the optical fibers and stabilize a spliced state of the optical fibers.

The invention claimed is:

1. A fusion splicing apparatus comprising:
a pair of discharge electrodes configured to discharge-heat end faces of a pair of optical fibers for fusion splicing the end faces to each other;
holding units configured to hold the pair of optical fibers;
V-groove blocks each having a V-groove, the V-groove configured to receive, position, and fix a part of the optical fiber on an end-face side of the holding unit;
V-groove-block moving mechanisms configured to move the V-groove blocks to shift an axial center of the pair of optical fibers from a straight line joining the pair of discharge electrodes to each other; and
holding-unit moving mechanisms moving the holding units according to the movements of the V-groove-block moving mechanisms so that the axial center of the pair of optical fibers is shifted from the straight line joining the pair of discharge electrodes to each other while the pair of optical fibers is roughly in a straight line between the V-groove-block and the holding, wherein the holding-unit moving mechanism includes:
a pair of first and second guide faces that cross the moving direction of the holding unit;
the first guide face being a tilt face tilted with respect to a plane that is orthogonal to the moving direction;
a first guide member that is positioned between the pair of guide faces, is in contact with the tilt face, and is moved along the plane that is orthogonal to the moving direction;
a second guide member that is in contact with the second guide face opposing the tilt face and is moved along the plane that is orthogonal to the moving direction; and
a drive unit that moves the guide members along the plane that is orthogonal to the moving direction.

2. The fusion splicing apparatus according to claim 1, wherein
the first and second guide members are rotary bodies that are rotatably supported with one rotary support shaft.

3. A fusion splicing method of a pair of optical, the method comprising:
providing a fusion splicing apparatus which includes a pair of discharge electrodes, holding units, V-groove blocks, V-groove block moving mechanisms, and holding-unit moving mechanisms;
holding the pair of optical fibers with the holding units;
receiving, positioning, and fixing parts of the optical fibers on splicing end face sides of the holding units in V-grooves of the V-groove blocks;
moving the V-groove blocks by the V-groove block moving mechanisms thereby shifting to shift an axial center of the pair of optical fibers from a virtual straight line that joins the pair of discharge electrodes to each other;
moving the holding units by the holding-unit moving mechanisms according to the movements of the V-groove block moving mechanisms, thereby shifting the axial center of the pair of optical fibers from the straight line that joins the pair of discharge electrodes to each other while the pair of optical fibers is roughly in a straight line between the V-groove-block and the holding unit; and
fusion splicing the end faces of the pair of optical fibers by discharge heating, wherein
the holding units are moved by the holding-unit moving mechanism which includes:
a pair of first and second guide faces that cross the moving direction of the holding unit;
the first guide face being a tilt face tilted with respect to a plane that is orthogonal to the moving direction;
a first guide member that is positioned between the pair of guide faces, is in contact with the tilt face, and is moved along the plane that is orthogonal to the moving direction;
a second guide member that is in contact with the second guide face opposing the tilt face and is moved along the plane that is orthogonal to the moving direction; and
a drive unit that moves the guide members along the plane that is orthogonal to the moving direction.

4. The fusion splicing method according to claim 3, comprising:
photographing the pair of optical fibers with a camera; and
moving the V-groove blocks and holding units according to a positional relationship of the photographed pair of optical fibers.

* * * * *